Figure 1:
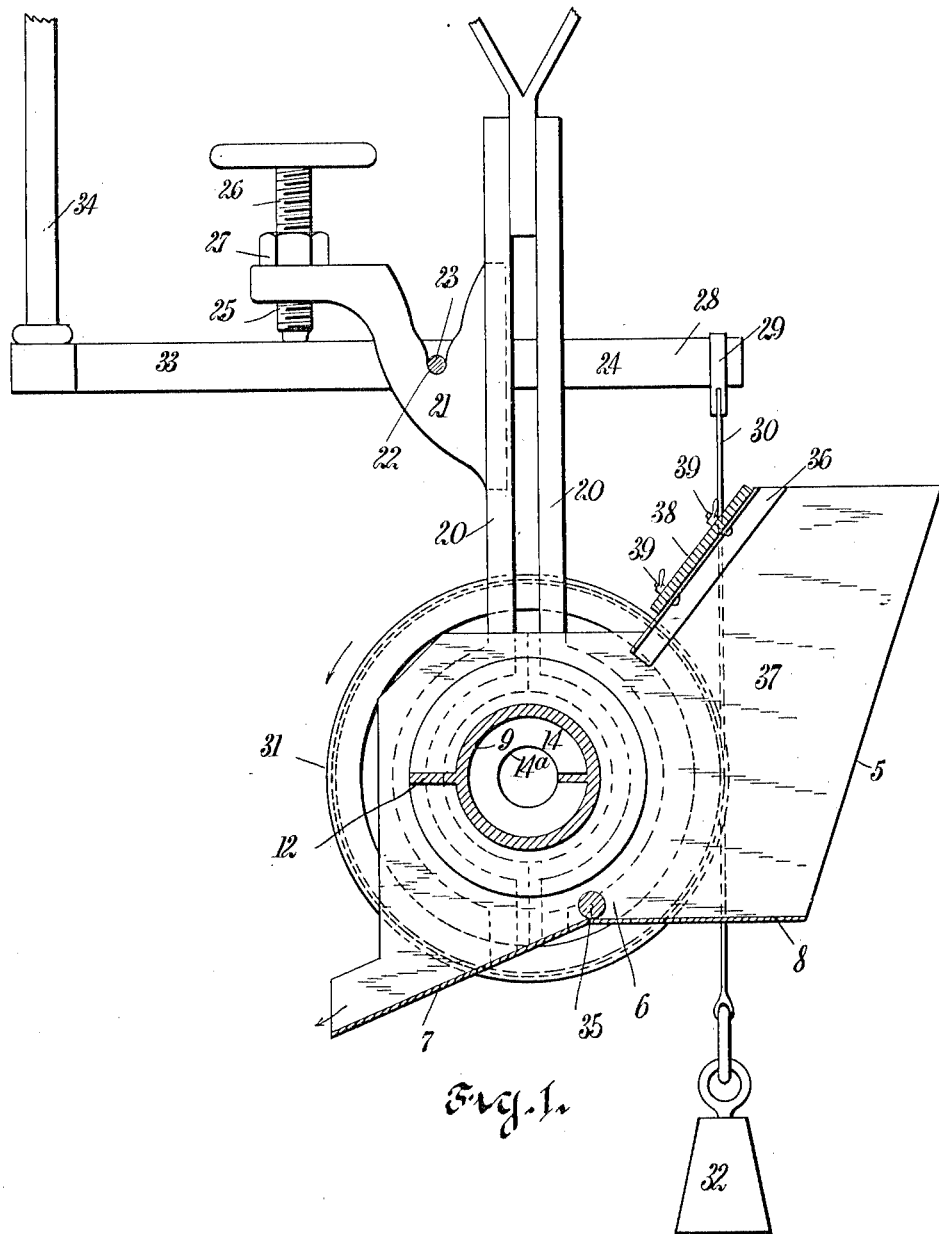
Figure 2:
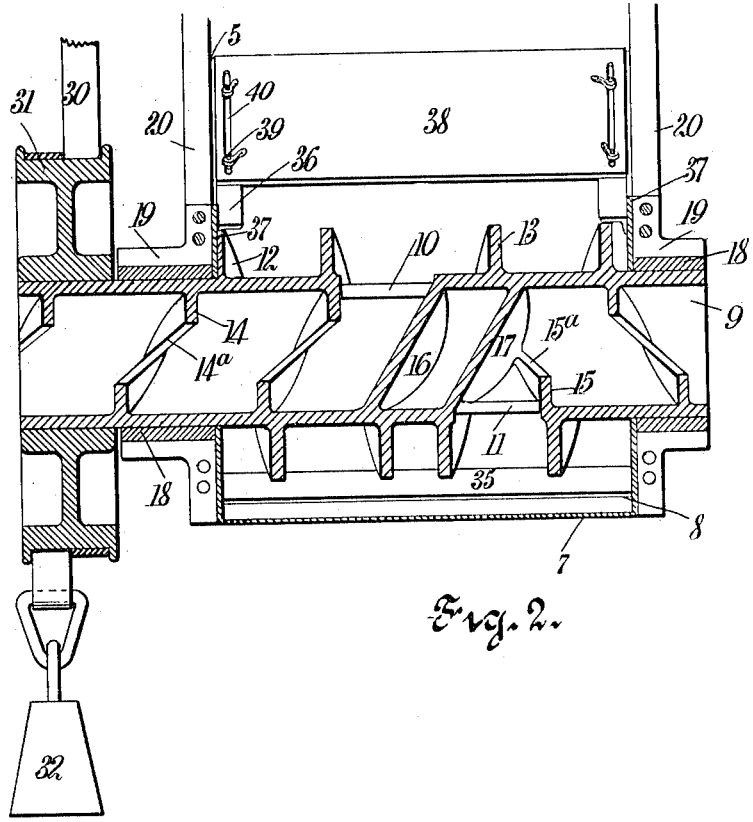
Figure 3:
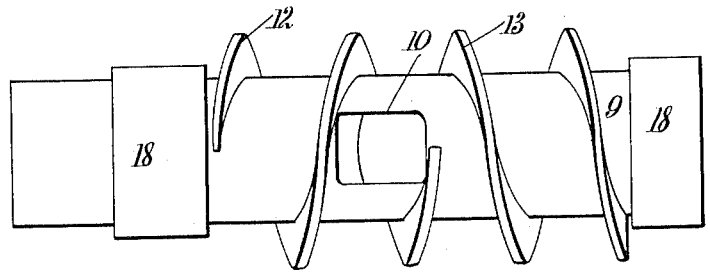
Figure 1:
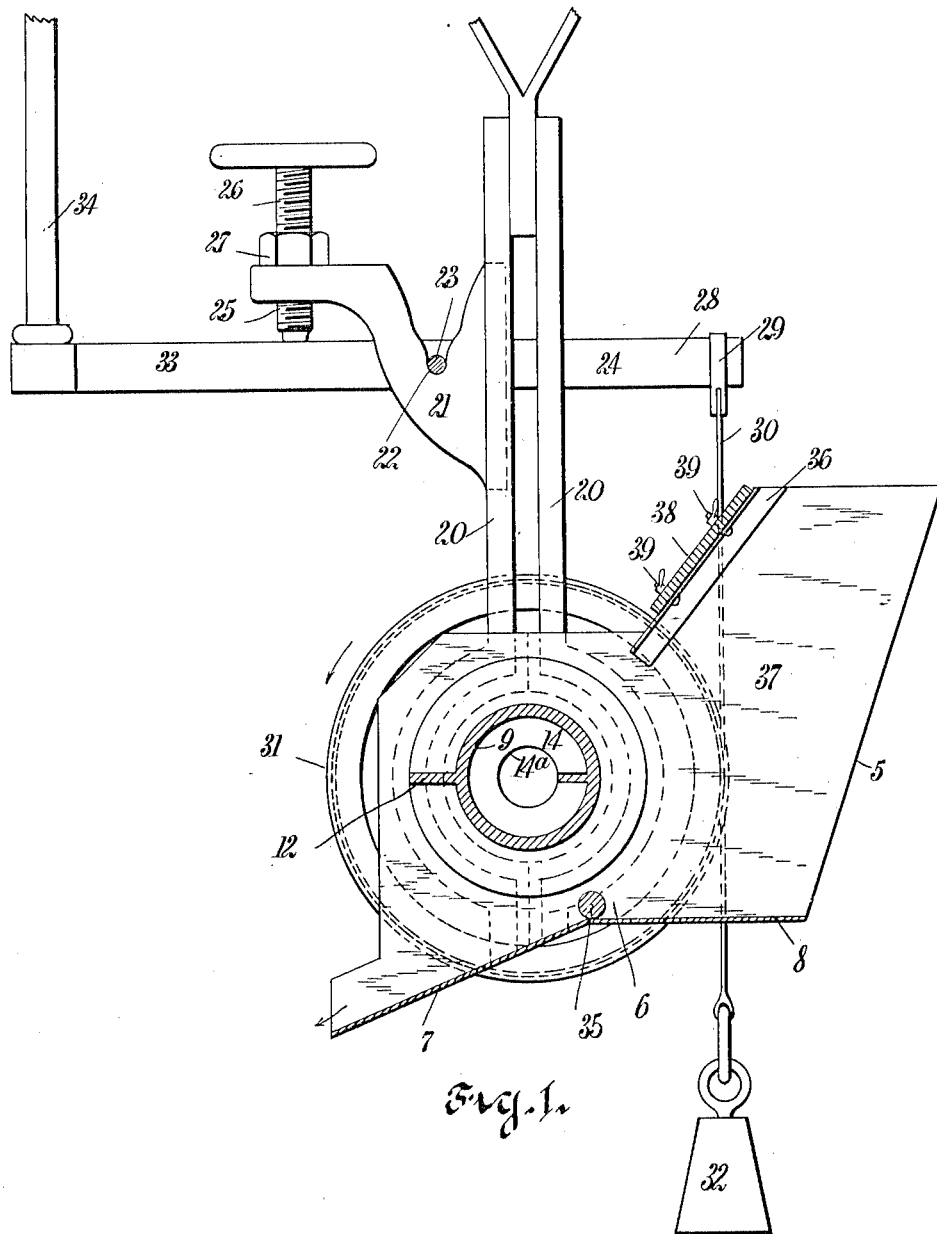

W. L. MOREHOUSE.
ORE FEEDER AND SAMPLER.
APPLICATION FILED JUNE 20, 1912.

1,079,184.

Patented Nov. 18, 1913.

2 SHEETS—SHEET 1.

WITNESSES

INVENTOR
Walton L. Morehouse
BY
ATTORNEYS

W. L. MOREHOUSE.
ORE FEEDER AND SAMPLER.
APPLICATION FILED JUNE 20, 1912.

1,079,184.

Patented Nov. 18, 1913.

2 SHEETS—SHEET 2.

WITNESSES

INVENTOR
Walton L. Morehouse

ATTORNEYS

W. L. MOREHOUSE.
ORE FEEDER AND SAMPLER.
APPLICATION FILED JUNE 20, 1912.

1,079,184.

Patented Nov. 18, 1913.
2 SHEETS—SHEET 1.

WITNESSES

INVENTOR
Walton L. Morehouse
BY
ATTORNEYS tube, through the openings 10 and 11, and will be conveyed to the ends of the tube by the spiral conveyer members 14 and 15.

It will be understood that a downward movement of the reciprocating member 34 will operate the lever and draw the belt 30 upward, the counterweight 32 taking up the slack of the belt 30 after each stroke. The belt 30 and weight 32 make it unnecessary to provide ratchets or gears. The tube 9 rotates in one direction only, for while the weight is sufficient to hold the belt taut when the belt is drawn upward, it is not sufficient to rotate the tube on the downward movement of the weight. It is obvious that as the tube 9 rotates only in one direction, the movement of the member 34 may be so timed that one of the openings 10 and 11 of the tube will be in position to receive the ore when the tube is at rest.

Having thus described my invention I claim as new and desire to secure by Letters Patent:

1. In an ore feeder and sampler, a hopper, a tube disposed adjacent the hopper and having an opening through its side, and an open end, an outer spiral conveyer member on the tube for engaging the material as it falls from the hopper for conveying the material to the opening through the side of the tube when the tube is rotated in one direction, and an inner spiral conveyer member in the tube for conveying the material from the opening and to the said end when the tube is rotated in the said direction.

2. In an ore feeder and sampler a hopper having an opening in its side, a tube horizontally disposed at the opening, there being an opening through the side of the tube, inner and outer spiral conveyer members on the tube and a chute at the said side of the hopper below the opening and extending from the hopper, the chute having a member spaced from the outer spiral conveyer member to limit the flow of material between the tube and the chute.

3. In an ore feeder and sampler a hopper having an opening in its side, a tube horizontally disposed at the opening, there being an opening through the side of the tube, inner and outer spiral conveyer members on the tube, a chute at the said side of the hopper below the opening, and extending from the hopper, the chute having a member spaced from the outer spiral conveyer member to limit the flow of material between the tube and the chute, and an adjustable plate secured to the hopper for limiting the flow of material from the hopper and over the tube.

4. In an ore feeder and sampler a hopper having an opening in its side, a tube horizontally disposed at the opening, there being an opening through the side of the tube, inner and outer spiral conveyer members on the tube, a chute at the said side of the hopper below the opening and extending from the hopper, the chute having a member spaced from the outer spiral conveyer member to limit the flow of material between the tube and the chute, a belt disposed around the tube, and means to pull the belt alternately in opposite directions.

In testimony whereof I have signed my name to this specification in the presence of two subscribing witnesses.

WALTON LAKE MOREHOUSE.

Witnesses:
J. W. WILKEY,
F. WILKEY.

Copies of this patent may be obtained for five cents each, by addressing the "Commissioner of Patents, Washington, D. C."